US012661659B2

(12) United States Patent
Lautala et al.

(10) Patent No.: US 12,661,659 B2
(45) Date of Patent: Jun. 23, 2026

(54) DUST SEALING

(71) Applicant: METSO FINLAND OY, Espoo (FI)

(72) Inventors: Aki Lautala, Espoo (FI); Mika Peltonen, Espoo (FI); Maxime Delahaye, Espoo (FI); Paulo Barscevicius, Espoo (FI)

(73) Assignee: Metso Finland Oy, Espoo (FI)

( * ) Notice: Subject to any disclaimer, the term of this patent is extended or adjusted under 35 U.S.C. 154(b) by 313 days.

(21) Appl. No.: 18/685,707

(22) PCT Filed: Aug. 17, 2022

(86) PCT No.: PCT/FI2022/050534
§ 371 (c)(1),
(2) Date: Feb. 22, 2024

(87) PCT Pub. No.: WO2023/025982
PCT Pub. Date: Mar. 2, 2023

(65) Prior Publication Data
US 2024/0351045 A1 Oct. 24, 2024

(30) Foreign Application Priority Data
Aug. 25, 2021 (FI) ..................................... 20215892

(51) Int. Cl.
*B02C 2/04* (2006.01)
*B02C 23/28* (2006.01)

(52) U.S. Cl.
CPC ................ *B02C 2/04* (2013.01); *B02C 23/28* (2013.01)

(58) Field of Classification Search
None
See application file for complete search history.

(56) References Cited

U.S. PATENT DOCUMENTS 4,034,922 A 7/1977 Coxhill
4,919,348 A * 4/1990 Johnson .................... B02C 2/04 241/215

(Continued)

FOREIGN PATENT DOCUMENTS

CN 103212460 A * 7/2013
CN 203264836 U * 11/2013

(Continued)

OTHER PUBLICATIONS

Search Report for Finnish Patent Application No. 20215892, dated Mar. 1, 2022.

(Continued)

*Primary Examiner* — Jared O Brown
(74) *Attorney, Agent, or Firm* — Andrus Intellectual Property Law, LLP

(57) ABSTRACT

An arrangement for dust blocking in a cone crusher, a cone crusher, and a method for the dust blocking and manufacturing the cone crusher, in which a crusher head is supported by a support cone. A linear actuator vertically moves the crusher head for setting adjustment and/or tramp iron release. A lower surface of the support cone, at least in part, defines a downwards opening annular cavity. The crusher head radially movably supports a seal ring. A lip is formed for the annular cavity by the seal ring. A slip ring extends into the annular cavity beyond the seal ring and forms a counter-surface for the seal ring. The slip ring at least in part defines a pressurised gas supply channel and an entry channelling interconnecting the pressurised gas supply channel to the annular cavity.

15 Claims, 12 Drawing Sheets

(56) References Cited

U.S. PATENT DOCUMENTS

| | | | | |
|---|---|---|---|---|
| 5,964,422 | A * | 10/1999 | Ruokonen | B02C 2/02<br>241/216 |
| 2002/0088886 | A1 | 7/2002 | Zortman | |
| 2006/0131453 | A1* | 6/2006 | Barscevicius | B02C 2/047<br>241/36 |
| 2012/0006918 | A1* | 1/2012 | Belotserkovskiy | B02C 2/04<br>241/207 |
| 2016/0346785 | A1* | 12/2016 | Szczelina | B02C 2/04 |
| 2017/0333909 | A1* | 11/2017 | Kuvaja | F16J 15/3268 |

FOREIGN PATENT DOCUMENTS

| | | | | |
|---|---|---|---|---|
| CN | 207655206 | U * | 7/2018 | |
| CN | 111266148 | A * | 6/2020 | B02C 23/00 |
| CN | 211463268 | U * | 9/2020 | |
| GB | 688258 | A | 3/1953 | |
| JP | H0563645 | U | 8/1993 | |
| WO | WO-2013155150 | A1 * | 10/2013 | B02C 2/04 |
| WO | 2016097465 | A1 | 6/2016 | |
| WO | WO-2022269123 | A1 * | 12/2022 | B02C 2/045 |

OTHER PUBLICATIONS

Office Action for Finnish Patent Application No. 20215892, mailed May 25, 2023.

International Search Report and Written Opinion for PCT Application No. PCT/FI2022/050534, mailed Nov. 28, 2022.

International Preliminary Report on Patentability for PCT Application No. PCT/FI2022/050534, mailed Dec. 11, 2023.

* cited by examiner

PRIOR ART

DUST SEALING

CROSS-REFERENCE TO RELATED APPLICATIONS

This application is the U.S. national stage application of International Application PCT/FI2022/050534, filed Aug. 17, 2022, which international application was published on Mar. 2, 2023, as International Publication WO 2023/025982 A1 in the English language. The International Application claims priority of Finnish Patent Application No. 20215892 filed Aug. 25, 2021.

TECHNICAL FIELD

The present invention relates to a dust sealing of a crusher. In particular, but not exclusively, the invention relates to a dust sealing of a cone crusher with a piston movable main shaft for setting adjustment.

BACKGROUND

This section illustrates useful background information without admission of any technique described herein representative of the state of the art.

Crushing of mineral material produces dust and accordingly measures need to be taken to protect the parts of the mineral material processing plant against harmful effects that can be caused by the produced dust.

A cone crusher has an upper frame supporting a fixedly mounted outer crushing shell and a lower frame that supports a rotating eccentric that forms a tilting movement on a main shaft. The main shaft carries a crusher head and an inner crushing shell also called as a mantle fixedly mounted on the crusher head. In operation, the crusher head is eccentrically moved and mineral material, such as stones, enters between the inner and outer crushing shells is crushed to smaller particles and fine particles as dust.

The eccentric of the cone crusher operates by sliding an eccentric against other surfaces. An oil lubrication is required to avoid excessive wear. The oil needs to be kept clean just next to the crushing process that produces plenty of mineral dust and particles. A dust sealing is thus required to protect the lubricated surfaces. However, the sealing needs to allow the eccentric movement of the crusher head and vertical movements of the crusher head. Vertical movements are caused by setting adjustments as well as occasional tramp iron release movements in which the setting is opened fast by moving the crusher head down. These vertical movements are actuated with a hydraulic cylinder that acts on the main shaft via a thrust bearing.

The sealing of the cone crusher is implemented using a slip ring on top of the lower frame to protect driving gear of the eccentric among others from dust and mineral material particles. The slip ring has an outwards sloping flange, a vertical skirt sealing with the lower frame, and a cylindrical neck on top. The neck has a cylindrical outer surface that meets a seal ring carried by the crusher head. More particularly, the seal ring is carried movably in an annular groove formed into the crusher head. An example of such a cone crusher is provided in WO2016/097465.

Due to the geometry of a cone crusher, crushing movements cause repeating vertical and lateral movement of the outer surface of the neck with relation to the seal ring, and movement of the seal ring deeper into the groove and back. As the seal ring wears on sliding within the annular groove, the groove is defined on one side by a removable cover to allow replacement of the seal ring when the cone crusher is opened for maintenance by separating the main shaft with crusher head from the lower frame.

In a so-called load mode wherein the setting of a crusher is substantially continuously adjusted in order to maintain a desired pressure level and/or power consumption level, the sealing moves up and down on the surface of the slip ring. The same occurs in an overload or a tramp release situation.

The up and down movement of the sealing causes wear to the sealing elements and their counterpart surfaces and the clearance therebetween increases causing the dust and fine mineral material particles to penetrate between the sealing arrangement and the slip ring or other counterpart of the sealing. In result the lubricating oil may contaminate resulting in increased wear of any lubricated parts that move against other parts. Accordingly, an improved sealing arrangement is desired for the crusher head moving both laterally and vertically.

The objective of the invention is to provide a dust sealing mitigating the problems of existing sealing.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first aspect of the invention there is provided a cone crusher, comprising:

a crusher head comprising a support cone;

a linear actuator for vertically moving the crusher head for setting adjustment and/or tramp iron release;

the support cone comprising a lower surface that at least in part defines a downwards opening annular cavity; the cone crusher further comprising:

a seal ring that is radially movably supported by the crusher head, and that forms a lip for the annular cavity; and a slip ring extending into the annular cavity beyond the seal ring and forming a counter-surface for the seal ring;

wherein the slip ring at least in part defines:

a pressurised gas supply channel; and an entry channelling;

and wherein the entry channelling interconnects the pressurised gas supply channel to the annular cavity for allowing a perimetrically distributed entry of pressurised gas into the annular cavity.

The slip ring may at least in part define a pressurised gas distribution passage, wherein the pressurised gas distribution passage interconnects the pressurised gas supply channel and the entry channelling.

The pressurised gas distribution passage may extend entirely around the slip ring. Alternatively, the pressurised gas distribution passage may extend more than 30 degrees around the slip ring or more than 100 degrees or more than 160 degrees or more than 300 degrees around the slip ring.

The pressurised gas distribution passage may consist of multiple separate sections and/or multiple independent channels.

The perimetrically distributed entry of pressurised gas may distribute the entry to the annular cavity to at least five separate regions. The perimetrically distributed entry of pressurised gas may be continuous. Alternatively, the perimetrically distributed entry of pressurised gas may be discrete.

The slip ring may comprise a skirt configured to seal with a lower frame of the cone crusher.

The slip ring may comprise an outwards sloping flange. The flange may reside on top of the skirt. The flange may be radially limited by the skirt. The flange may be integrally formed with the skirt.

The slip ring may comprise a neck on top of the flange. The flange may be radially surrounding the neck. The neck may be integrally formed with the flange.

The pressurised gas distribution passage may reside at least partially in the skirt. The entry channelling may extend through the flange and the neck.

The pressurised gas distribution passage may reside at least partially in the flange. The entry channelling may extend through the neck. The entry channelling may extend through a portion of the flange.

The cone crusher may comprise a pressurised gas supply channel to conduct pressurised gas to the pressurised gas distribution passage. The supply channel may at least partly pass through the skirt. The supply channel may at least partly pass through the flange. The supply channel may at least partly pass through the neck.

The supply channel may be formed using a cover attached onto a surface of the slip ring. The cover may be attached onto an inner surface of the slip ring so that the cover is not exposed by mineral material passing through the cone crusher. The cover may have a concave profile for forming the supply channel onto a straight surface of the slip ring.

The pressurised gas distribution passage may reside at least partially in the neck.

The pressurised gas distribution passage and the entry channelling may be adjoined.

The cone crusher may comprise a ring-shaped counterpart configured to form at least one side of the pressurised gas distribution passage when positioned next to the slip ring.

According to a second aspect of the invention there is provided an arrangement for dust blocking in cone crusher that comprises:

- a crusher head comprising a support cone;
- a linear actuator for vertically moving the crusher head for setting adjustment and/or tramp iron release; and
- the support cone comprising a lower surface that at least in part defines a downwards opening annular cavity; the cone crusher further comprising:
- a seal ring that is radially movably supported by the crusher head, and that forms a lip for the annular cavity; the arrangement comprising:
- a slip ring configured to extend into the annular cavity beyond the seal ring and forming a counter-surface for the seal ring;
- wherein the slip ring at least in part defines:
  - a pressurised gas supply channel; and
  - an entry channelling;
- and wherein the entry channelling interconnects the pressurised gas supply channel to the annular cavity for allowing a perimetrically distributed entry of pressurised gas into the annular cavity.

According to a third aspect of the invention there is provided a method for blocking entry of dust into a cone crusher, comprising:

- supporting a crusher head by a support cone;
- vertically moving by a linear actuator the crusher head for setting adjustment and/or tramp iron release;
- defining, at least in part by a lower surface of the support cone, a downwards opening annular cavity;
- radially movably supporting, by the crusher head, a seal ring; and
- forming a lip for the annular cavity by the seal ring;
- wherein a slip ring extends into the annular cavity beyond the seal ring and forms a counter-surface for the seal ring;
- defining at least in part by the slip ring:
  - a pressurised gas supply channel; and
  - an entry channelling;
- and interconnecting, by the entry channelling, the pressurised gas supply channel to the annular cavity for allowing a perimetrically distributed entry of pressurised gas into the annular cavity.

According to a fourth aspect of the invention there is provided a method for manufacturing a cone crusher, comprising:

- providing a crusher head comprising a support cone; and
- providing a linear actuator for vertically moving the crusher head for setting adjustment and/or tramp iron release;
- the support cone comprising a lower surface that at least in part defines a downwards opening annular cavity; the method further comprising:
- providing a seal ring that is radially movably supported by the crusher head, and that forms a lip for the annular cavity;
- providing a slip ring extending into the annular cavity beyond the seal ring and forming a counter-surface for the seal ring;
- defining at least in part by the slip ring:
  - a pressurised gas supply channel; and
  - an entry channelling;
- and interconnecting, by the entry channelling, the pressurised gas supply channel to the annular cavity for allowing a perimetrically distributed entry of pressurised gas into the annular cavity.

Different non-binding example aspects and embodiments have been illustrated in the foregoing. The embodiments in the foregoing are used merely to explain selected aspects or steps that may be utilised in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps. It should be appreciated that the illustrated figures are not entirely in scale, and that the figures mainly serve the purpose of illustrating embodiments of the invention.

Figure 1:
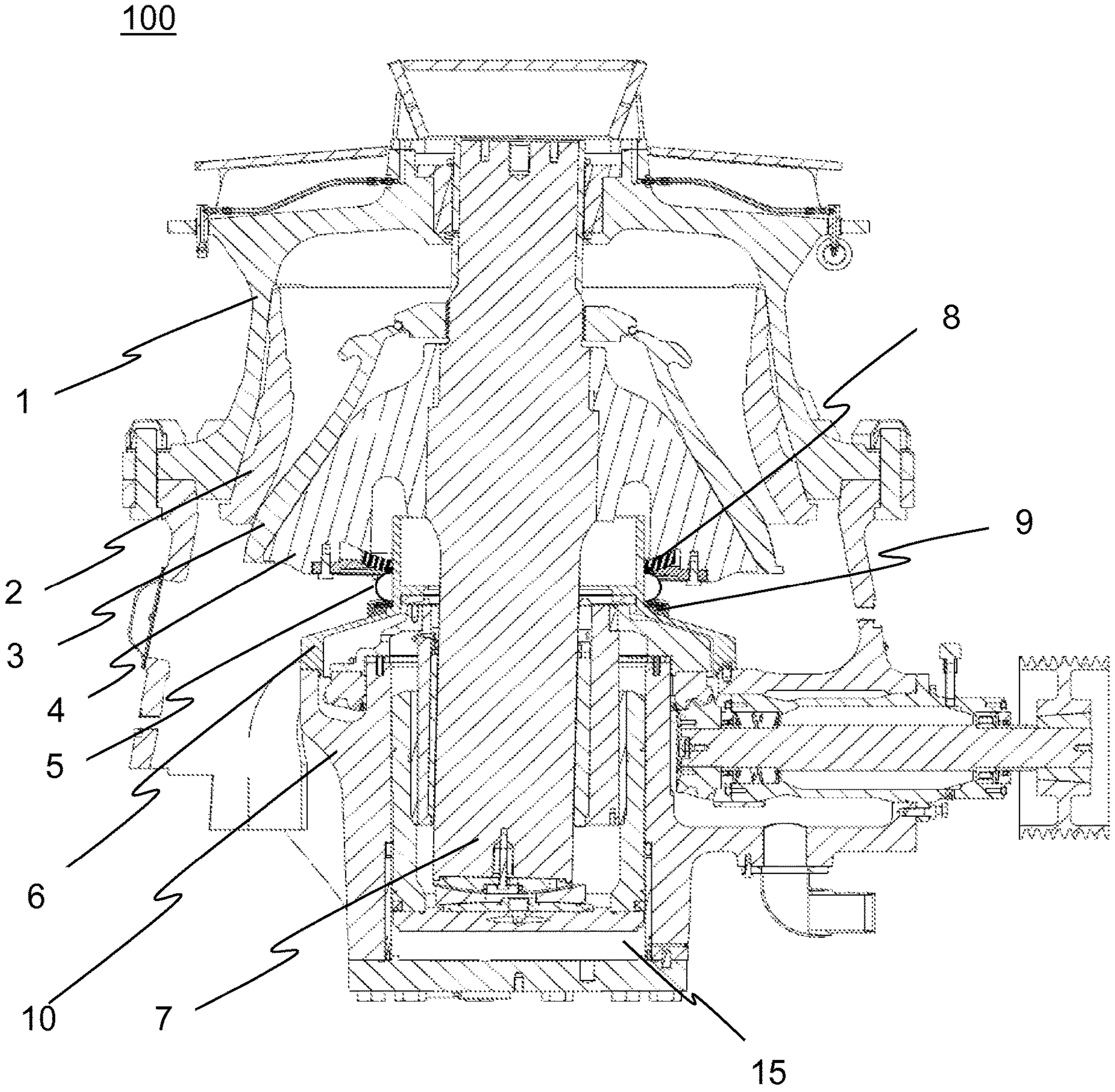
FIG. 1 shows a schematic cross-sectional view of a cone crusher comprising a dust sealing according to an example embodiment of the invention.

FIG. 1 shows a schematic cross-sectional view of a cone crusher 100 known from prior art. FIG. 1 shows an upper crusher frame 1. An outer wear part 2 is attached to the upper crusher frame 1. An inner wear part 3 is attached to a crusher head 4. The inner and the outer wear part define therebetween a crushing chamber. Mineral material to be crushed is fed to the crushing chamber. FIG. 1 further shows a slip ring, or a dust collar, 6 and a main shaft 7 configured for eccentric rotation. The main shaft 7 is attached to the crusher head 4 for providing the gyratory movement for crushing the mineral material between the inner 3 and outer 2 wear parts. The crusher further comprises hydraulic cylinder 15 for adjusting the setting of the crusher. A skilled person appreciates that FIG. 1 shows further previously known elements of the crusher 100 not explicitly mentioned herein, such as the drive arrangement of the main shaft, thrust bearings and eccentric sleeves.

The slip ring 6 is attached to a lower frame 10 of the crusher and is configured to provide dust protection for the inner elements of the crusher, such as power transmission and the eccentric sleeves. The slip ring 6 has a cylindrical form is configured to provide a sliding surface for a seal ring 8.

On crushing mineral material in the crushing chamber, dust is also produced. The dust is harmful to the functioning of the crusher. For example, dust entering into the cone crusher may mix with lubricant of the sleeve and power transmission gearing so causing increased friction and wear to the parts. In order to inhibit dust entry in between the crusher head 4 and the slip ring 6, the seal ring 8 is provided. The seal ring 8 is held in place with a holding member.

The seal ring 8 has a ring-like form. The seal ring 8 is formed and held in place in such a way as to allow the eccentric movement of the head. The seal ring 8 has a first sliding surface on the inner perimeter against the slip ring 6 in order to inhibit dust entry between the seal ring 8 and the slip ring 6. The seal ring 8 further has a second surface on the upper surface against the head 4 in order to inhibit dust entry between the head 4 and the seal ring 8. The seal ring 8 further has a third sliding surface on the lower surface against the holding member again in order to inhibit dust entry therebetween. The seal ring 8 defines, or delimits, a first space above the seal ring comprising the space between the head 4 and the slip ring 6 and between the head 4 and the holding member.

The crusher head moves during crushing of mineral material up and down with relatively fast movements, for example 5 to 6 times per second. The fast movements may allow dust to penetrate between the seal ring 8 and the slip ring 6, the head 4 and the holding member. A second sealing member 9 may be provided around the slip ring 6 and a first flexible member 5 is attached between seal ring 8 and second sealing member 9. The seal ring 8 and the second sealing member 9 together with the first flexible member 5 prevent or reduce the penetration of dust between the crusher head 4 and the slip ring 6.

The prior known implementation of FIG. 1 helps to at least hinder dust entering between the sealing arrangement and the slip ring or other counterpart of the sealing, and thus, reducing contamination of lubricating oil resulting in decreased wear of any lubricated parts that move against other parts. However, the dust entry inhibition is based on an elastic body of rubber. Other alternatives are desired to overcome any problems that might arise with that implementation.

Figure 2A:
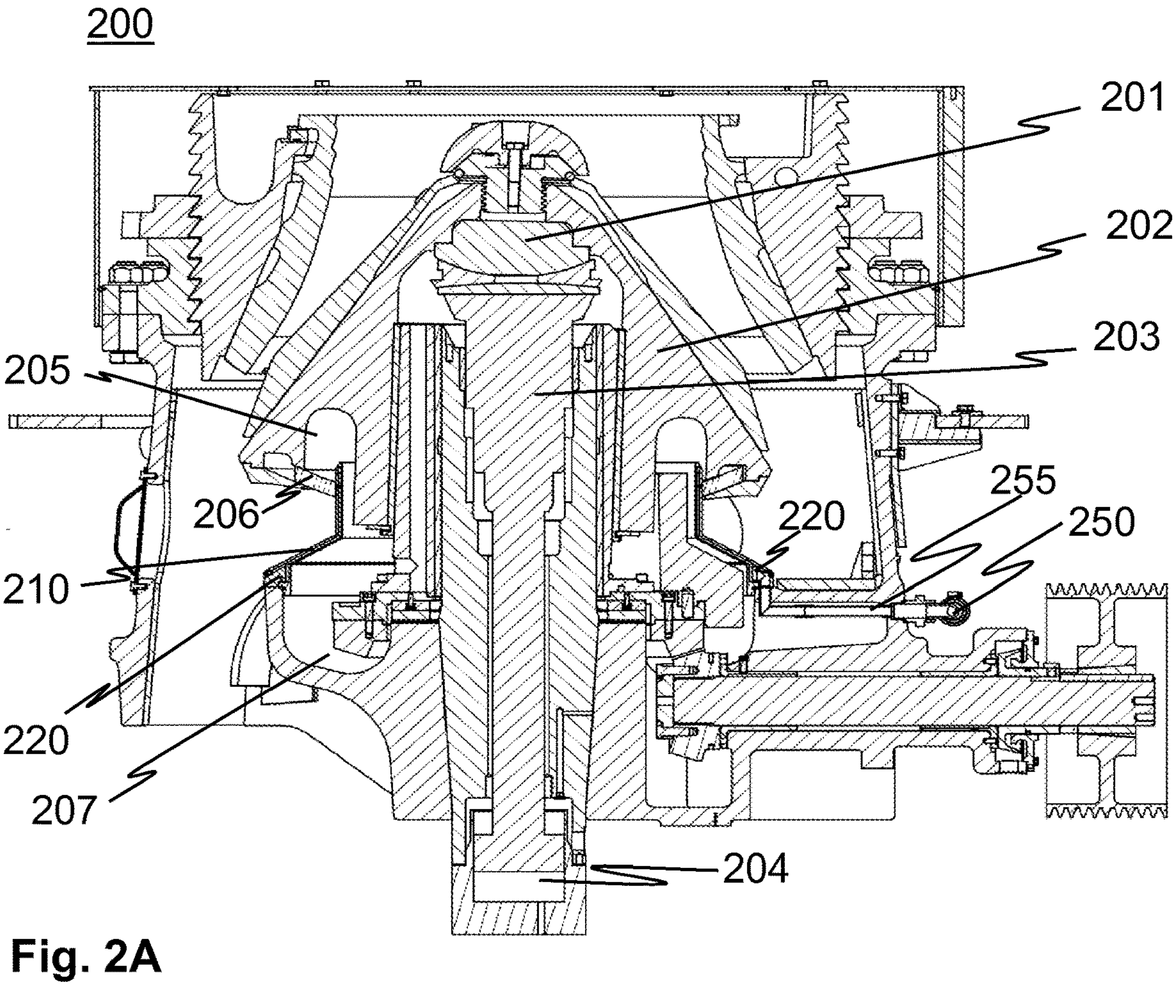
FIGS. 2A-2D show schematic sectional views of various details of a cone crusher according to some example embodiments.
Figure 2B:
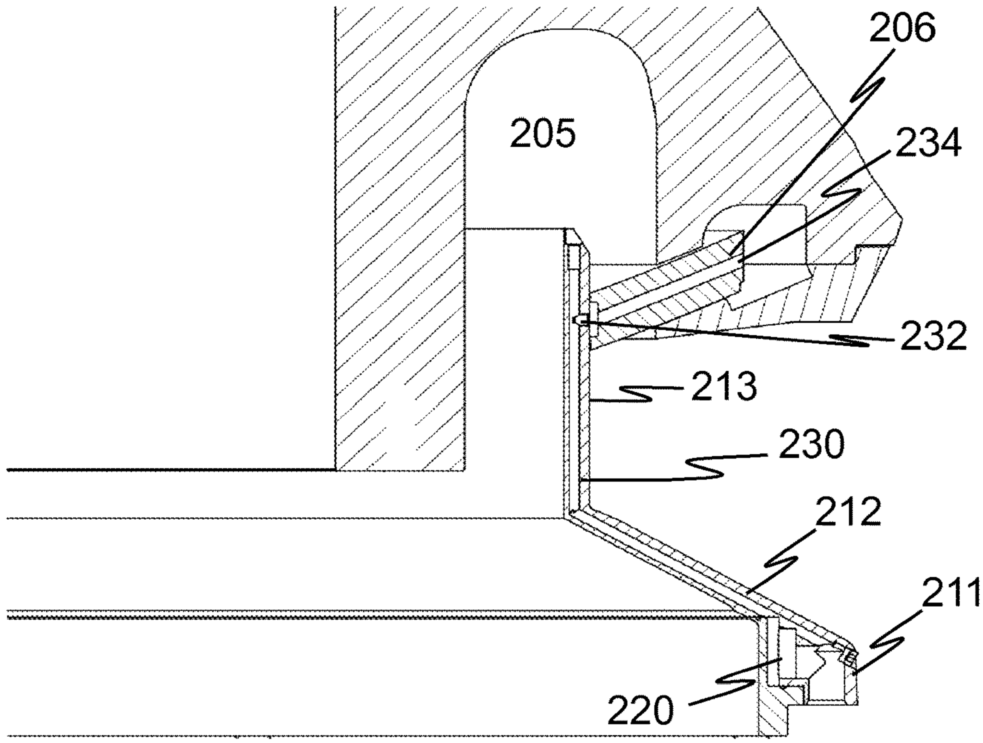
Figure 2C:
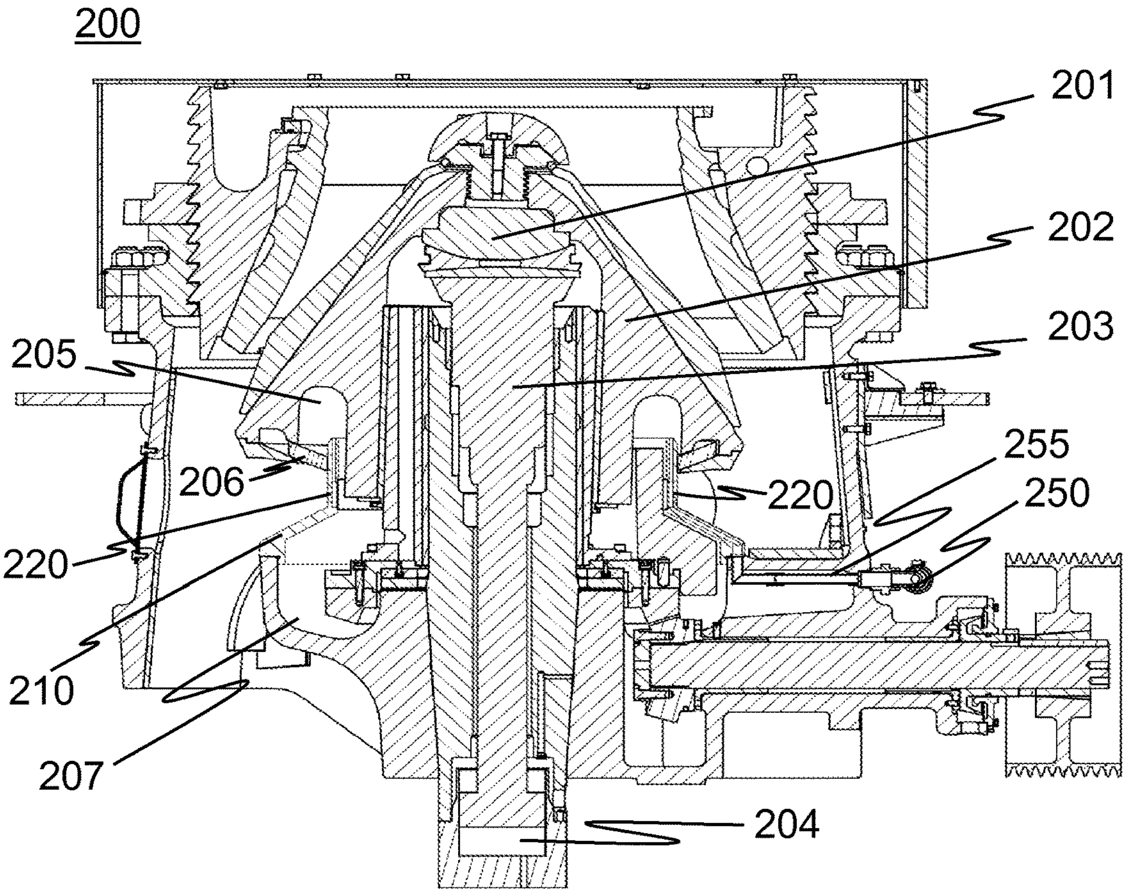
Figure 2D:
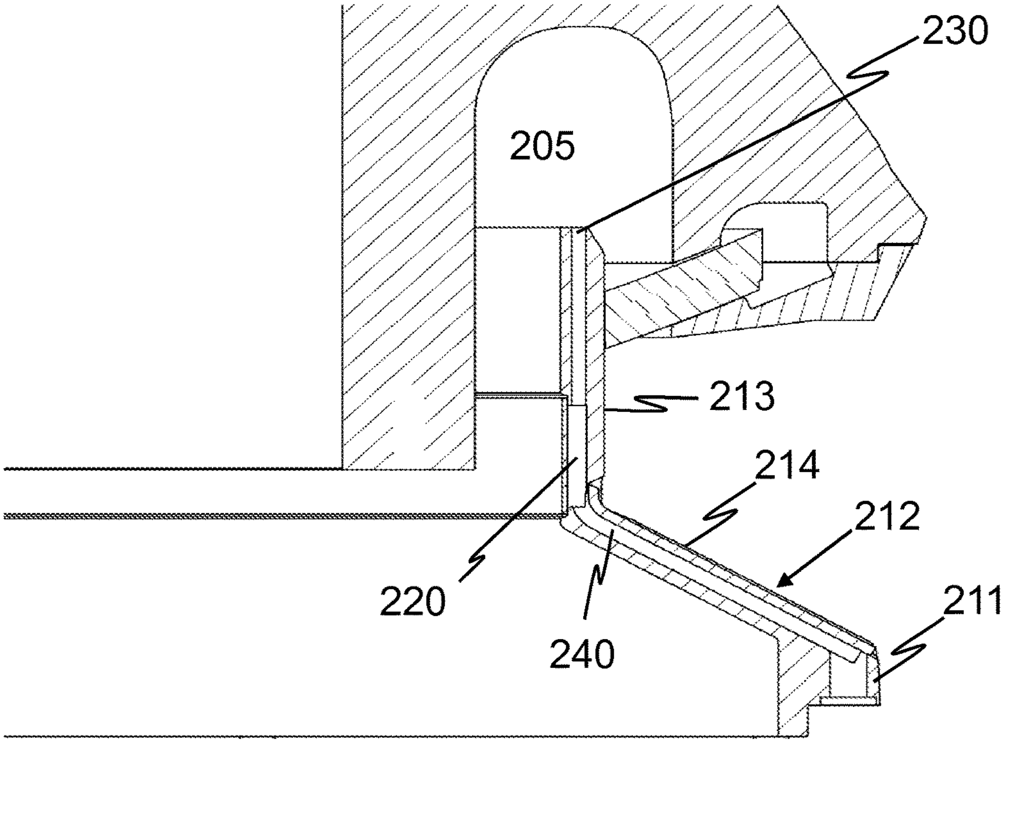

FIGS. 2A-2D show schematic sectional views of various details of a cone crusher according to some example embodiments. FIGS. 2A and 2C show a cone crusher 200 comprising a crusher head 201, a support cone 202, and main shaft 203 for supporting and moving the crusher head 201. The cone crusher 200 further comprises a linear actuator 204 for vertically moving the main shaft 203 for setting adjustment and/or tramp iron release. The support cone 202 comprises a lower surface that alone or together with the main shaft 203 defines a downwards opening annular cavity 205. The cone crusher 200 also comprises a seal ring 206. The seal ring 206 is radially movably supported by the crusher head 201. The seal ring 206 forms a lip 310 (FIG. 3) for the annular cavity 205. The cone crusher 200 further comprises a slip ring 210. The slip ring 210 extends into the annular cavity 205 beyond the seal ring 206. The slip ring 210 forms a counter-surface for the seal ring 206. Lubrication oil is provided into bearings or eccentric sleeves of the main shaft 203. The cone crusher 200 further comprises a draining bowl 207 for collecting lubrication oil used to lubricate the eccentric sleeves and/or the gearing of the power transmission. Some lubrication oil may also leak out of the cone crusher. The slip ring 210 and the seal ring 206 protect the lubrication oil in the draining bowl 207 against for dust contamination. Dust contamination is reduced by increasing air pressure in the annular cavity 205 and/or into the seal ring 206 and/or into the draining bowl 207 beyond atmospheric air pressure. The increased air pressure prevents or hinders dust entering into the sealed areas by forming a counterflow from inside out. Enlargement of the slip ring 210 is shown in FIGS. 2B and 2D. However, the increasing of air pressure may also cause high-speed streams of air that convey lubricant out of the cone crusher, especially if pressurised air is imported by some pressurised air nozzles.

The cone crusher 200 advantageously comprises a pressurised gas distribution passage 220. The pressurised gas distribution passage may enable importing pressurised air to the annular cavity perimetrically so that high-speed streams of air can be avoided, at least such that would be prone to eject lubricant out of the interior of the cone crusher.

The slip ring 210 comprises an entry channelling 230 interconnecting the gas distribution passage 220 and the annular cavity 205, as shown in FIGS. 2B and 2D. The entry channelling 230 allows a perimetrically distributed entry of pressurised gas into the annular cavity 205. The pressurised gas distribution passage 220 may extend entirely around the slip ring 210. In an embodiment, the pressurised gas distribution passage 220 extends more than 30 degrees around the slip ring or more than 100 degrees or more than 160 degrees or more than 300 degrees around the slip ring. In an example embodiment, the pressurised gas distribution passage 220 consists of multiple separate sections and/or multiple independent channels.

The perimetrically distributed entry 230 of pressurised gas may be continuous. For example, the perimetrically distributed entry 230 can be implemented using another ring-formed part such as the sleeve 402 of FIG. 4 inside the slip ring so that a suitable ring-shaped passage is formed. Alternatively, perimetrically distributed entry 230 of pressurised gas is discrete. In an embodiment, the perimetrically distributed entry 230 of pressurised gas distributes the entry to the annular cavity 205 to at least five separate regions.

The slip ring 210 comprises a skirt 211 configured to seal with a lower frame of the cone crusher. The slip ring 210 further comprises an outwards sloping flange 212. The flange 212 resides on top of the skirt 211. The flange 212 may be radially limited by the skirt 211. The flange 212 of FIG. 2 is integrally formed with the skirt 211. The slip ring 210 comprises a neck 213 on top of the flange 212. The flange 212 radially surrounds the neck 213. In an example embodiment, the neck 213 is integrally formed with the flange 212. In an example embodiment, the pressurised gas distribution passage 220 resides at least partially in the skirt 211. In an example embodiment, the entry channelling extends through the flange 212 and the neck 213. In an example embodiment, the pressurised gas distribution passage 220 resides at least partially in the flange 212. In an example embodiment, the entry channelling extends through the neck 213. In an example embodiment, the entry channelling 230 extends through a portion of the flange 212. In an example embodiment, the pressurised gas distribution passage 220 resides at least partially in the neck 213.

In the example embodiment shown in FIGS. 2A-2B, the pressurised gas distribution passage 220 is comprised by the skirt 211 of the slip ring 210, while in the example embodiment shown in FIGS. 2C-2D, the pressurised gas distribution passage 220 is comprised by the neck 213 of the slip ring 210. In other embodiments, any part 211-213 of a slip ring 210 comprises a pressurised gas distribution passage 220. In a further embodiment, the pressurised gas distribution passage 220 is arranged on a wall of any part 211-213 of a slip ring 210. In some embodiments, the entry channelling 230 provides pressurised gas into the annular cavity 205 and/or to the seal ring 206 as shown in FIG. 2B. FIG. 2B shows an optional side channel 232 configured to direct pressurised gas to flow against the seal ring 206. In an embodiment, there is a radial channel 234 through the seal ring 206. The radial channel 234 may comprise one or more continuous channels and/or holes. The radial channel 234 may be configured to receive pressurised gas from the side channel 232, in embodiments with the side channel 232.

It shall be appreciated that the slip ring may comprise on its internal or external surface a detachable part which in part forms the pressurised gas distribution passage 220.

In an example embodiment, the cone crusher 200 comprises a pressurised gas supply channel 240 to conduct pressurised gas to the entry channelling 230. In an embodiment, the entry channelling 230 and the pressurised gas supply channel 240 are interconnected through the pressurised gas distribution passage 220. In an example embodiment, the gas supply channel 240 and the entry channelling 230 are not aligned in order to even out a perimetrically distributed velocity profile of the pressurised gas. In an example embodiment, the supply channel 240 at least partly passes through the skirt 211. In an example embodiment of FIG. 2D, the supply channel 240 at least partly passes through the flange 212. In an example embodiment, the supply channel at least partly passes through the neck 213. In the example embodiments of FIGS. 2A and 2C, a single pressurised gas supply channel 240 is provided. In an example embodiment, the entry channelling 230 and the supply channel 240 are jointly formed. In the example of FIG. 2B, the entry channelling 230 continues from the neck 213 to the skirt 212. In an example embodiment, the pressurised gas supply channel 240 is coupled to a source of pressurised gas, e.g., to a compressor, by a coupler 250 and an inlet 255. In another example embodiment, multiple pressurised gas supply channels may be provided. In yet another example embodiment, the pressurised gas supply channels may be independent. The pressurised gas supply channels may comprise independent sources of pressurised gas.

In an example embodiment, the supply channel 240 is formed using a cover 214 (FIG. 2D) attached onto a surface of the slip ring 210, here onto the flange 212. In an example embodiment, the cover is attached onto an inner surface of the slip ring 210 so that the cover is not exposed by mineral material passing through the cone crusher 200. In an example embodiment, the cover has a concave profile for forming the supply channel 240 onto a straight surface of the slip ring 210.

In an example embodiment, the pressurised gas distribution passage 220 and the entry channelling 230 are adjoined.

In some example embodiments, the thickness of a slip ring 210 is over 15 mm or over 20 mm or over 25 mm or over 30 mm. In some example embodiments, the diameter of an inlet 255 is 10-30 mm, preferably 21 mm or 22 mm. In some example embodiments, the diameter of a supply channel is 5-10 mm, preferably 6 mm. In some example embodiments, the crosscut of pressurised gas distribution passage 220 is 5-10 mm wide. In some example embodiments, the crosscut of pressurised gas distribution passage 220 is 35-50 mm high.

In an embodiment, the cross-sectional area of the entry channelling 230 is at least 1 cm2, at least 2 cm2, at least 3 cm2, at least 4 cm2, at least 5 cm2, at least 10 cm2, or more at least in some part of the entry channelling 230.

In an embodiment, the cross-sectional area of the supply channel 240 is at least 1 cm2, at least 2 cm2, at least 3 cm2, at least 4 cm2, at least 5 cm2, at least 10 cm2, or more at least in some part of the supply channel 240.

In an embodiment, the cross-sectional area of the pressurised gas distribution passage 220 in the axial direction of the slip ring 210 is at least 1 cm2, at least 2 cm2, at least 3 cm2, at least 4 cm2, at least 5 cm2, at least 10 cm2, or more at least in some part of the pressurised gas distribution passage 220.

In an embodiment, the cross-sectional area in the direction of the gas flow of the pressurised gas distribution passage 220 is at least 1 cm2, at least 2 cm2, at least 3 cm2, at least 4 cm2, at least 5 cm2, at least 10 cm2, or more at least in some part of the pressurised gas distribution passage 220.

In an embodiment, the cross-sectional area of the pressurised gas distribution passage 220 and/or the cross-sectional area of the supply channel 240, and/or the cross-sectional are of the entry channelling 230 is/are at least the cross-sectional are of the inlet 255.

In an embodiment, the width of the crosscut of the pressurised gas distribution passage 220 is greater than the smallest thickness of the slip ring 210. In an embodiment, the width of the crosscut of the entry channelling 230 is greater than the smallest thickness of the slip ring 210. In an embodiment, the width of the crosscut of the supply channel 240 is greater than the smallest thickness of the slip ring 210.

In an embodiment, the pressurised gas distribution passage 220, the entry channelling 230, and the supply channel 240 are formed as an indivisible channel, forming logically different parts of the same physical flow connection. In an embodiment, the cross-sectional area of the physical flow connection is greater than or equal to the cross sectional are od inlet 255 in all parts of the flow connections.

Figure 3:
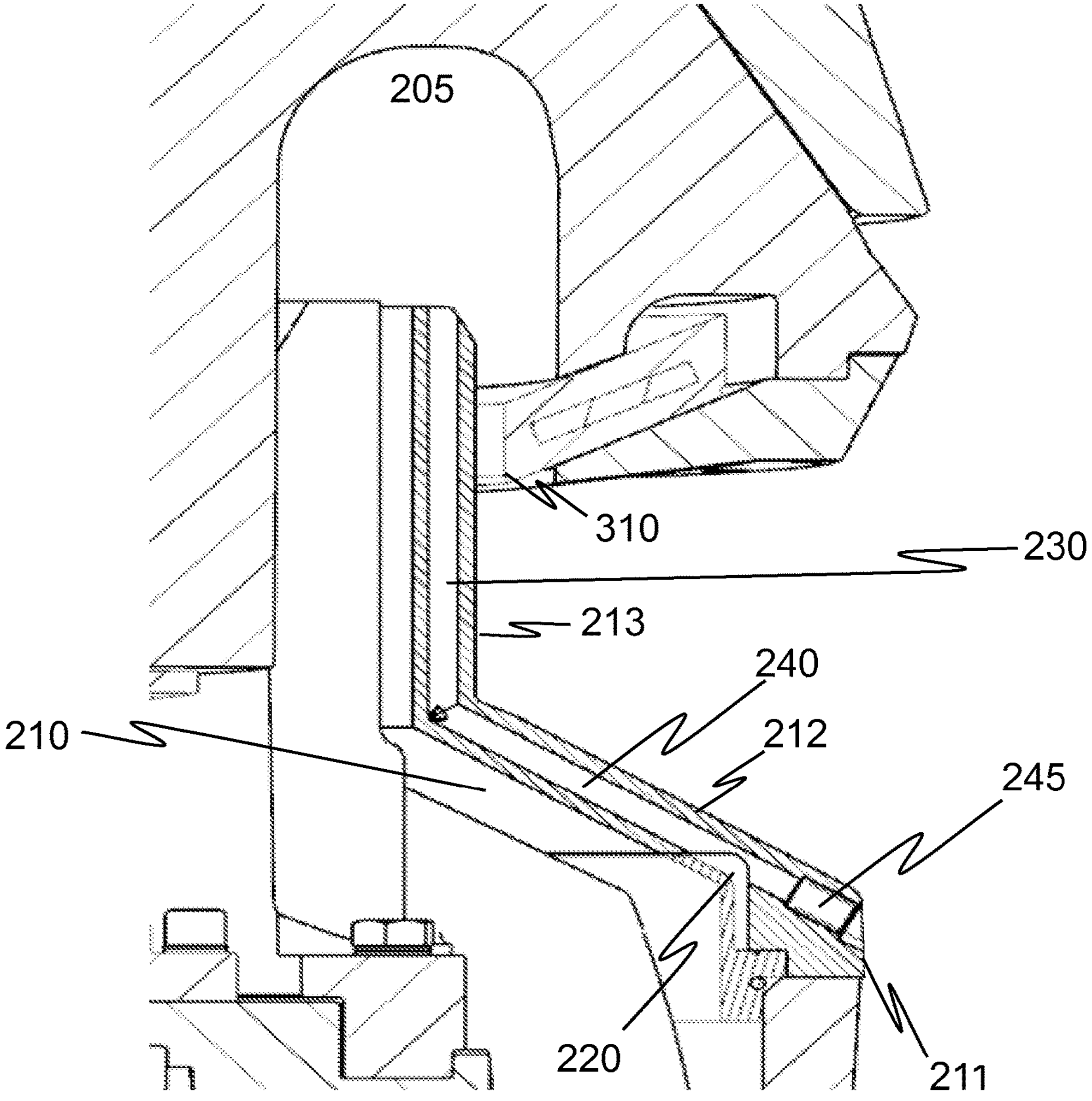
FIG. 3 shows an enlargement of a slip ring according to an example embodiment.

FIG. 3 shows an enlargement of a slip ring 210 according to an example embodiment. A supply channel 240 may be formed by drilling. A hole can be drilled from the skirt 211 through a flange 212. Another hole can be drilled through a neck 213 from the top part of the neck 213. At least one of the holes can be drilled through a pressurised gas distribution passage 220. In an example embodiment, the holes join at an interface of the neck 213 and flange 212. Any of the holes can be plugged from the skirt end with a plug or a screw 245 to prevent pressurised gas escaping from the skirt end of the supply channel 240. A hole coupled to source of pressurised gas is not plugged. In an example embodiment, multiple supply channels 240 can be formed. In an example embodiment, the pressurised gas distribution passage 220 join the multiple supply channels 240 to form a chamber for the pressurised gas. In some example embodiments, 15-85 cubic meters of pressurised air per hour is received from the source of pressurised gas.

Figure 4A:
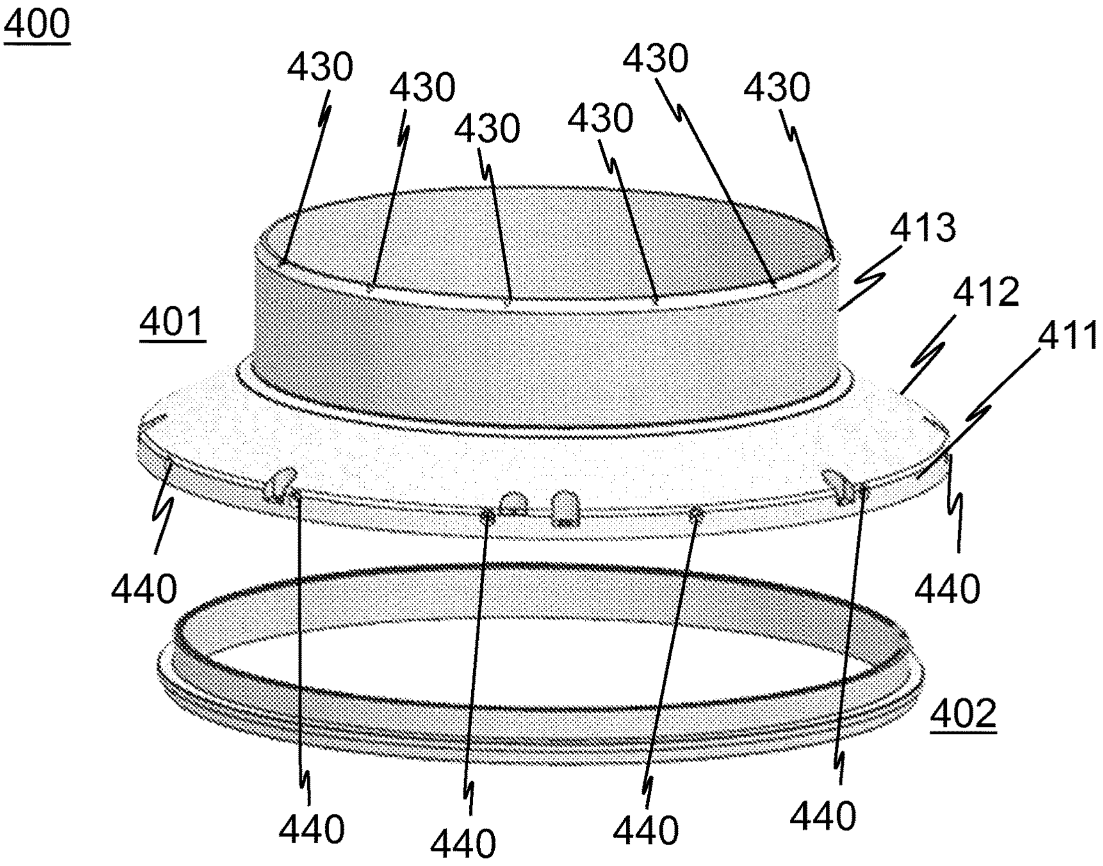
FIGS. 4A-4M show various example arrangements of a slip ring.
Figure 4B:
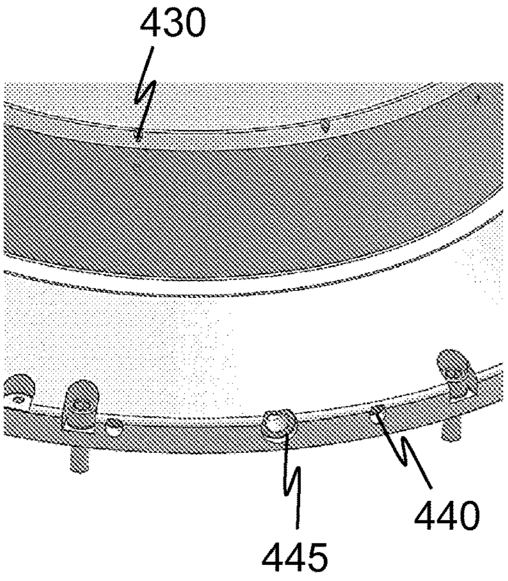
Figure 4C:
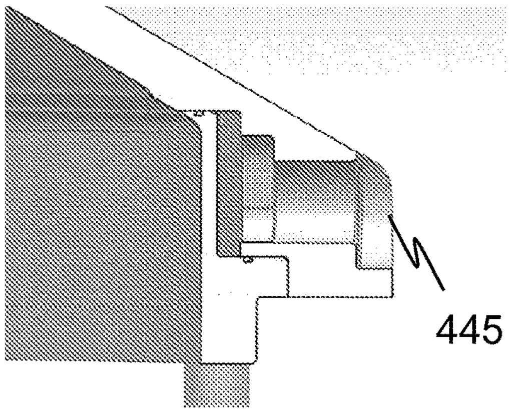
Figure 4D:
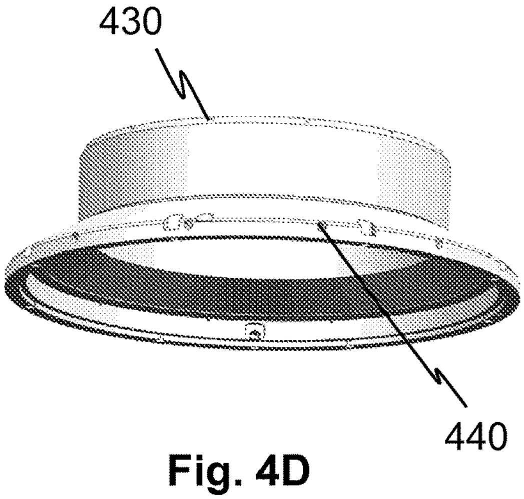
Figure 4E:
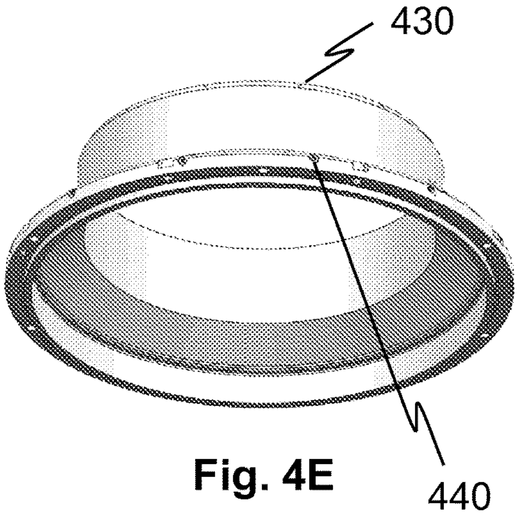
Figure 4F:
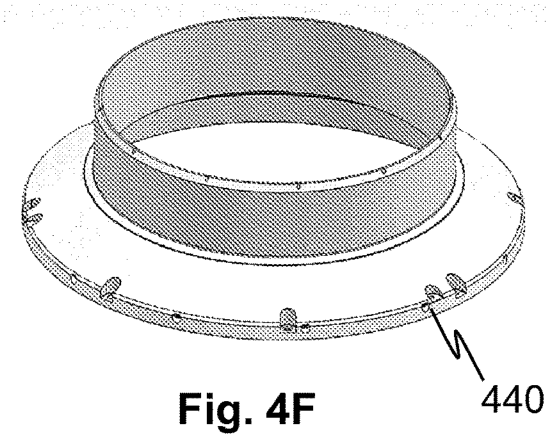
Figure 4G:
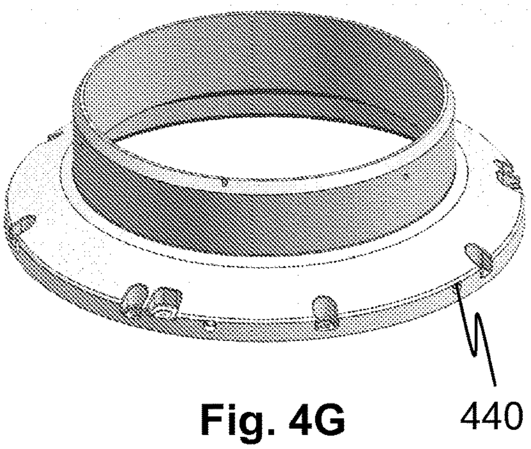
Figure 4H:
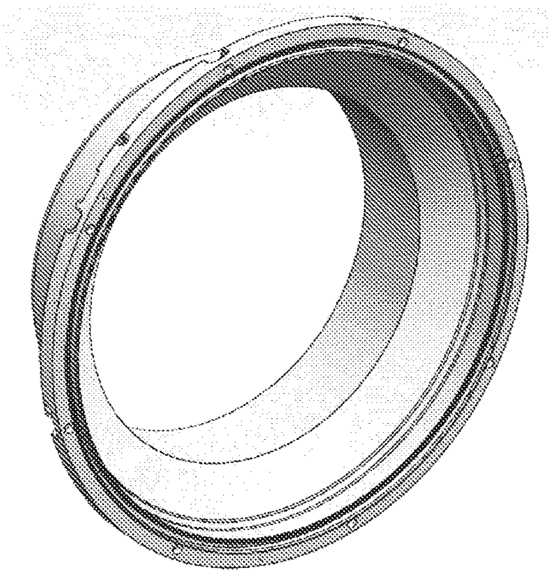
Figure 4I:
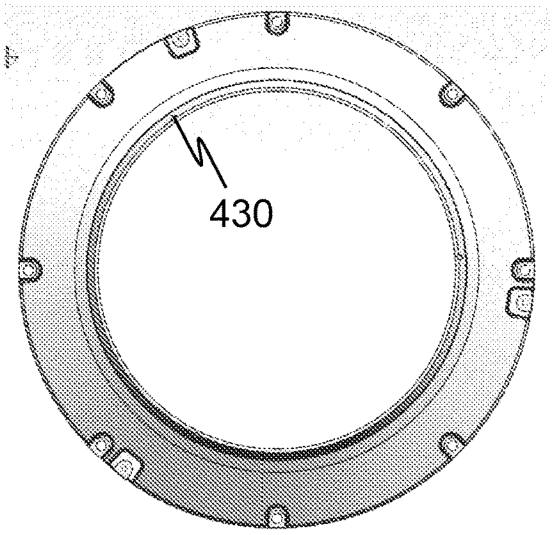
Figure 4J:
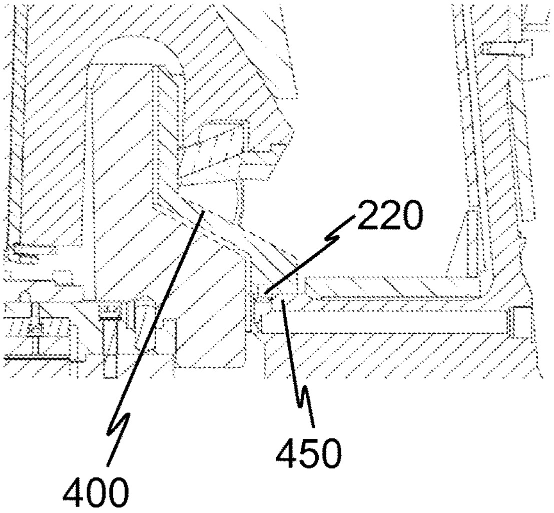
Figure 4K:
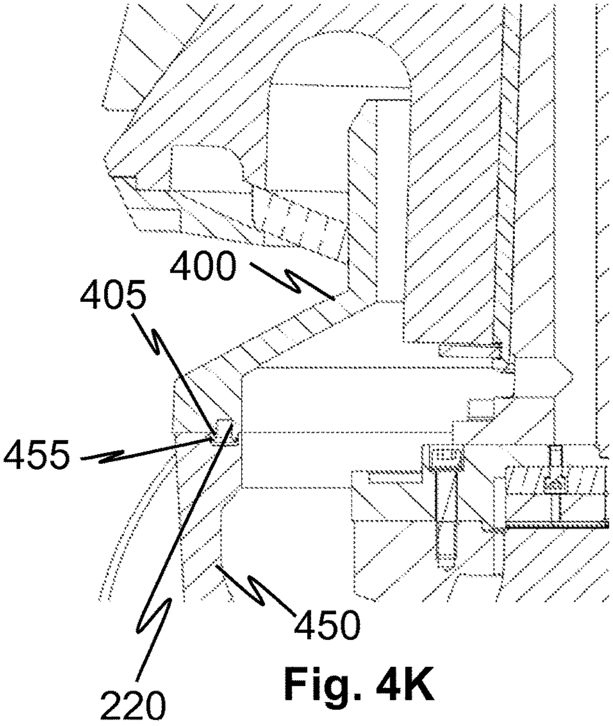
Figure 4L:
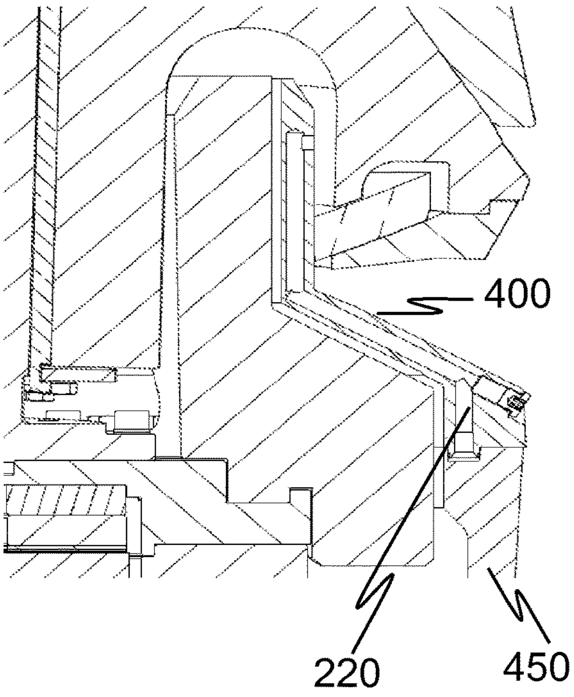
Figure 4M:
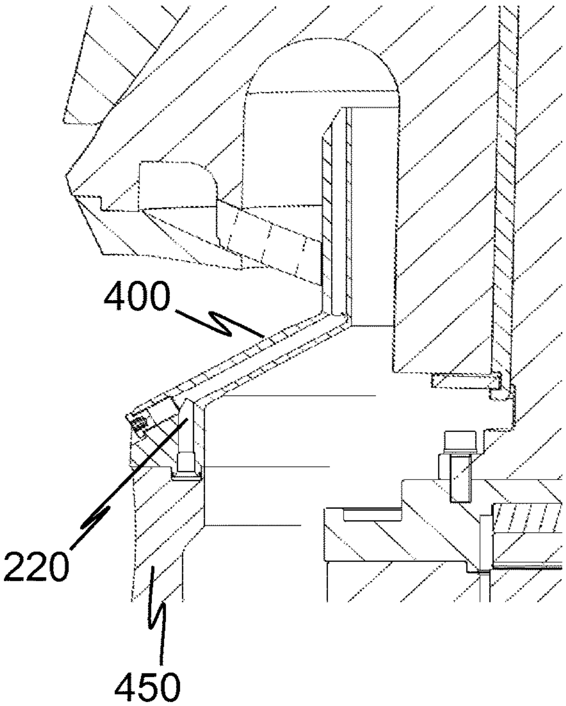

FIGS. 4A-4M show various example arrangements of a slip ring. FIG. 4A shows a slip ring 400 according to an example embodiment. The slip ring 400 comprises a top 401 and a sleeve 402. A pressurised gas distribution passage is formed between the sleeve 402 and the top 401 when they are arranged together. The slip ring 400 has multiple entry channellings 430 to provide pressurised gas into the annular cavity 205. In an example embodiment, a supply channel 240 is formed by drilling holes from the entry channelling through the neck 413 joining the holes 440 drilled from the skirt 411 through the flange 412. In an example embodiment, the channelling joins to the pressurised gas distribution passage 220 by the holes drilled through the neck 413 and/or by the holes drilled from the skirt 411 through the flange 412. Some of the holes 440 may be plugged with a plug or a screw 445, or alike, and the others may be coupled to a source of pressurised gas, as indicated in FIGS. 4B-4C. In FIGS. 4D-41, examples of slip rings are shown. In an embodiment, the slip ring 400 is formed using moulding process. In another embodiment, the slip ring 400 is formed using lathe work or turnery. In an embodiment, the slip ring 400 comprises compatible counterparts forming, between the counterparts, a hollow core defining the pressurised gas distribution passage 220. In another embodiment, the hollow core defines the pressurised gas distribution passage 220, the entry channelling 230, and the supply channel 240, or at least two of them.

FIGS. 4J-4M show example embodiments, where the pressurised gas distribution passage 220 is formed between the slip ring 400 and the lower frame 450 of the crusher. No additional parts or welding is required for forming the pressurised gas distribution passage 220 in these example embodiments. In the example embodiments of FIG. 4K, the slip ring 400 comprises a protrusion 405 and the lower frame 450 comprises a groove 455 enabling alignment of the slip ring 400 and the lower frame 450 by arranging the protrusion 405 into the groove 455. In another example, the slip ring 400 may comprise a groove and the lower frame 450 may comprise a protrusion.

By forming the pressurised gas distribution passage 220 in part to a groove formed on the lower frame 450 and/or the slip ring 400, it is possible to simultaneously distribute the pressurised gas and create an overpressure to the seam of the slip ring. The overpressure helps to prevent dust entry through the seam. As a further synergic effect, the formed annular groove is usable for central aligning the slip ring 400 onto the lower frame 450, when one of these parts has a matching protruding shape formed of single continuous or plural discontinuous parts.

Figure 5A:
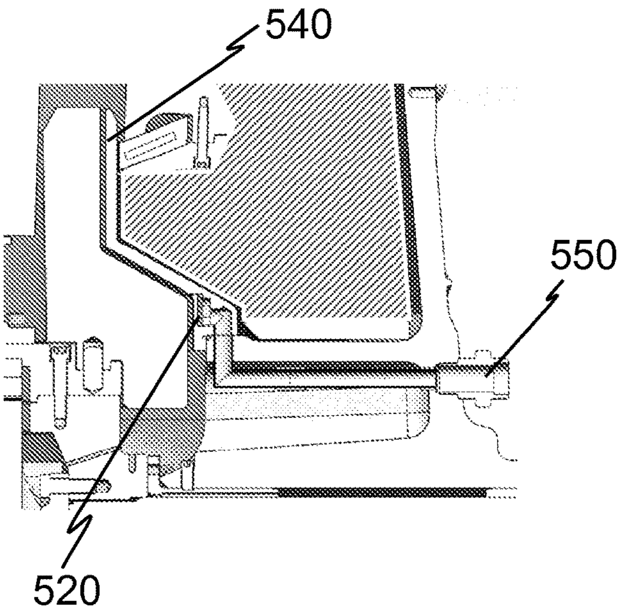
FIGS. 5A-5J show various example arrangements of supply channels.
Figure 5B:
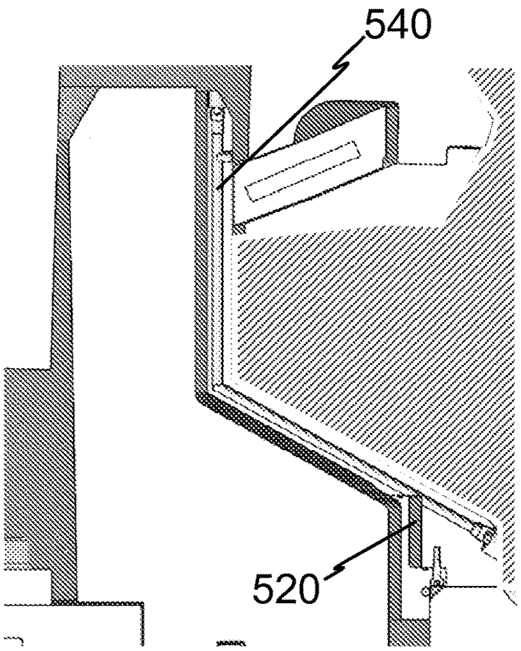
Figure 5C:
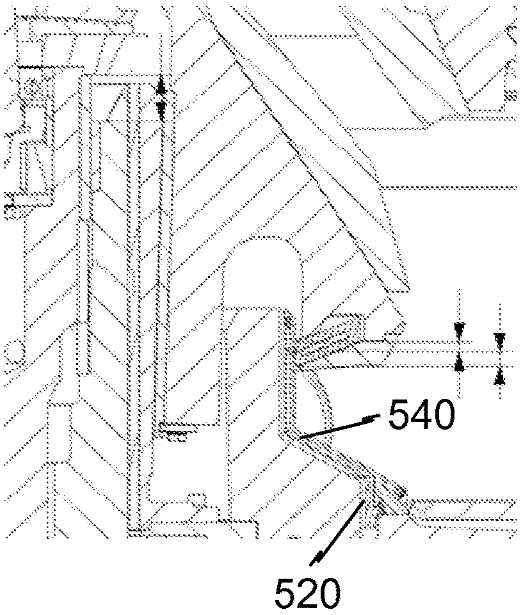
Figure 5D:
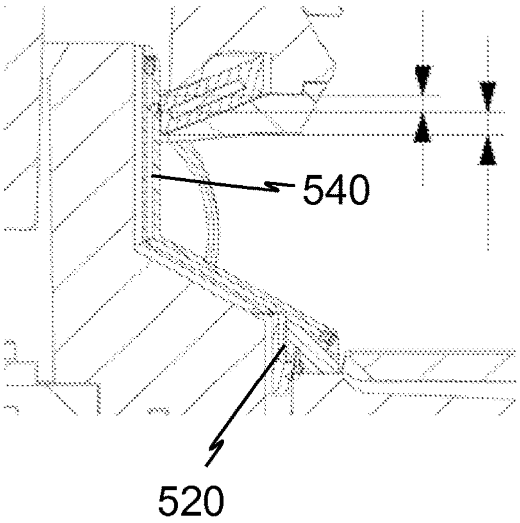
Figure 5E:
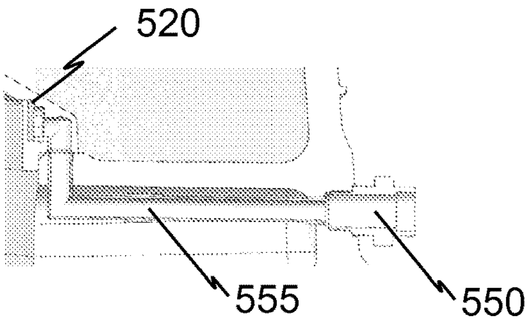
Figure 5F:
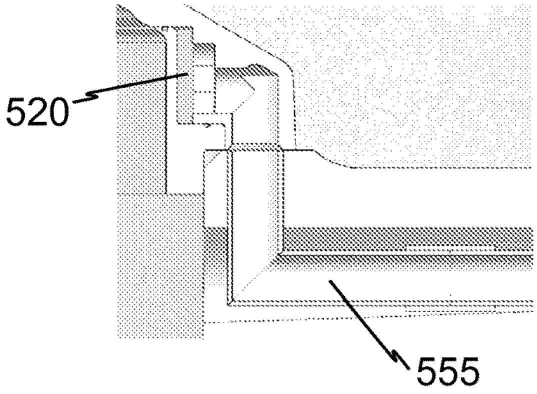
Figure 5G:
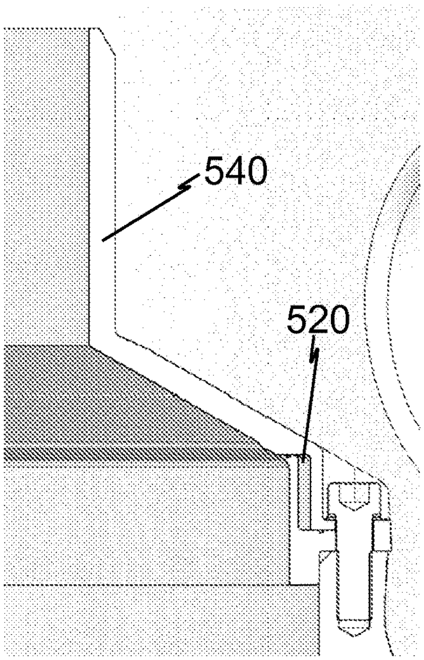
Figure 5H:
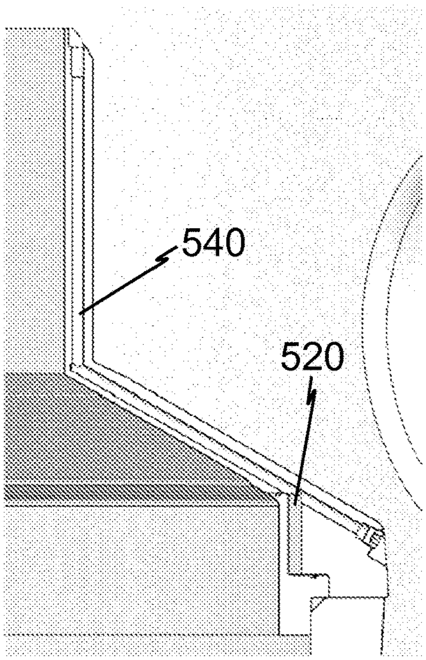
Figure 5I:
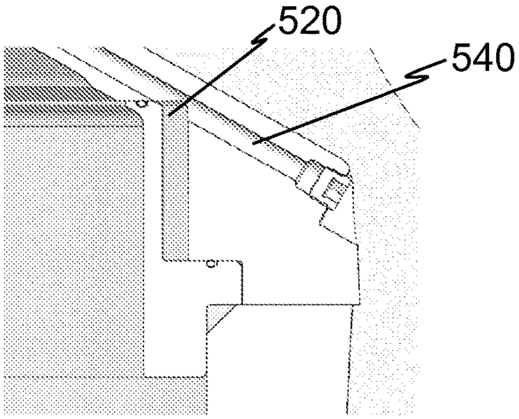
Figure 5J:
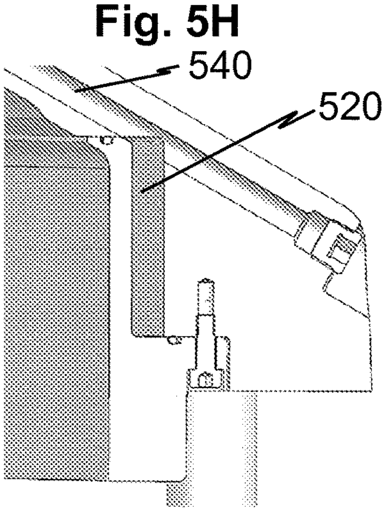

FIGS. 5A-5J show various example arrangements of the entry channelling. These slip ring arrangements comprise pressurised gas distribution passages 520 and supply channels 540. FIGS. 5E and 5F further show a coupler 550 and an inlet 555 for coupling to a source of pressurised gas according to an example embodiment.

Figure 6A:
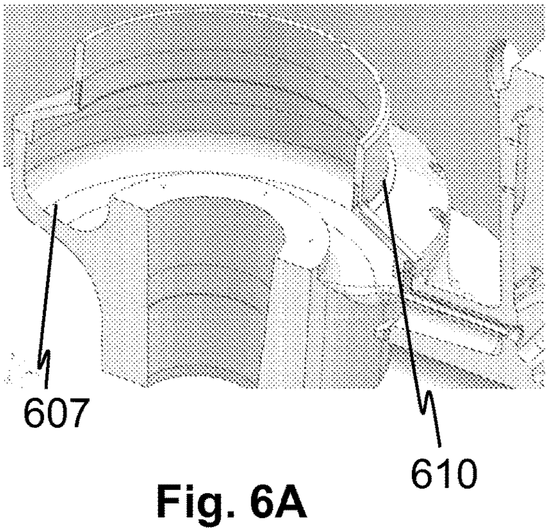
FIGS. 6A-6F show various example arrangements according to some example embodiments.
Figure 6B:
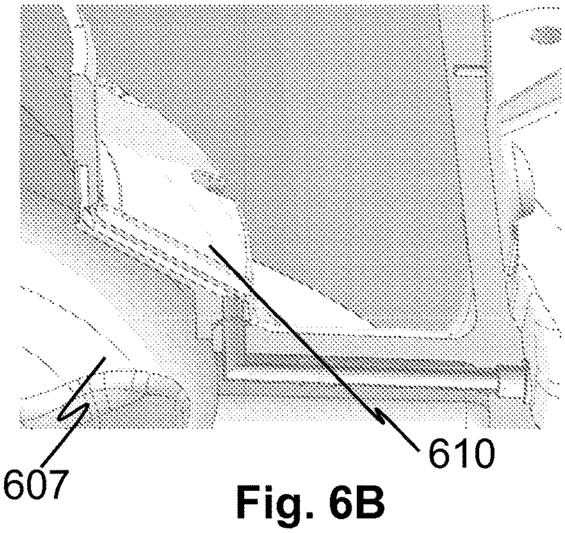
Figure 6C:
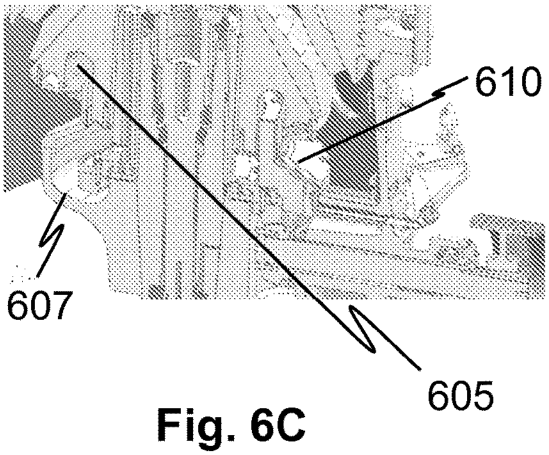
Figure 6D:
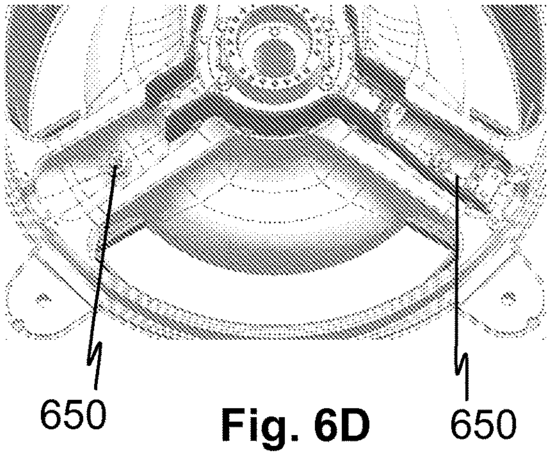
Figure 6E:
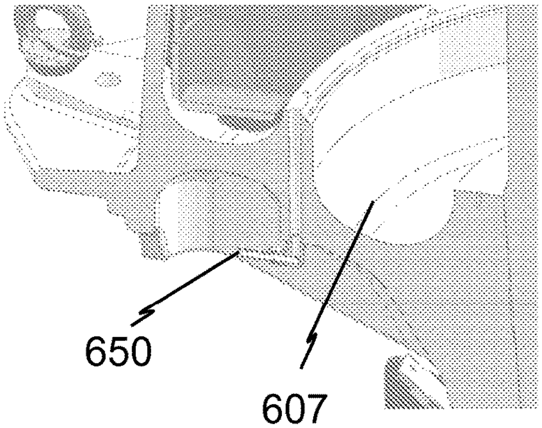
Figure 6F:
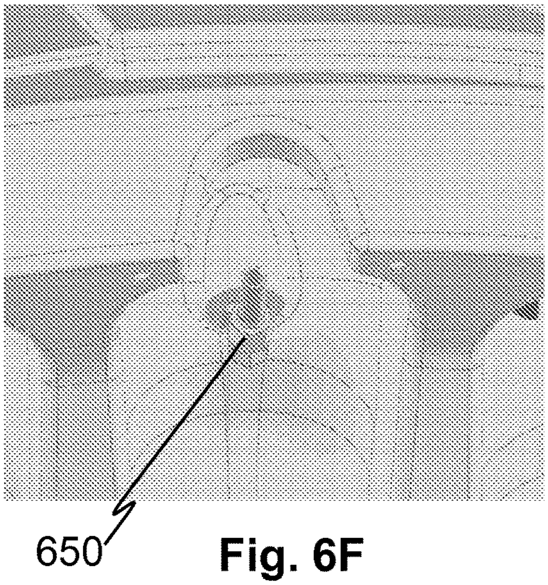

FIGS. 6A-6F show various example arrangements according to some example embodiments. Lubrication oil provided for the bearings of the main shaft of the crusher is collected by a draining bowl 607. The oil in a draining bowl is protected from contamination by a slip ring 610. FIG. 6C further shows a downwards opening annular cavity 605. FIGS. 6D-6F further show coupler 650 for coupling to sources of pressurised gas.

Figure 7A:
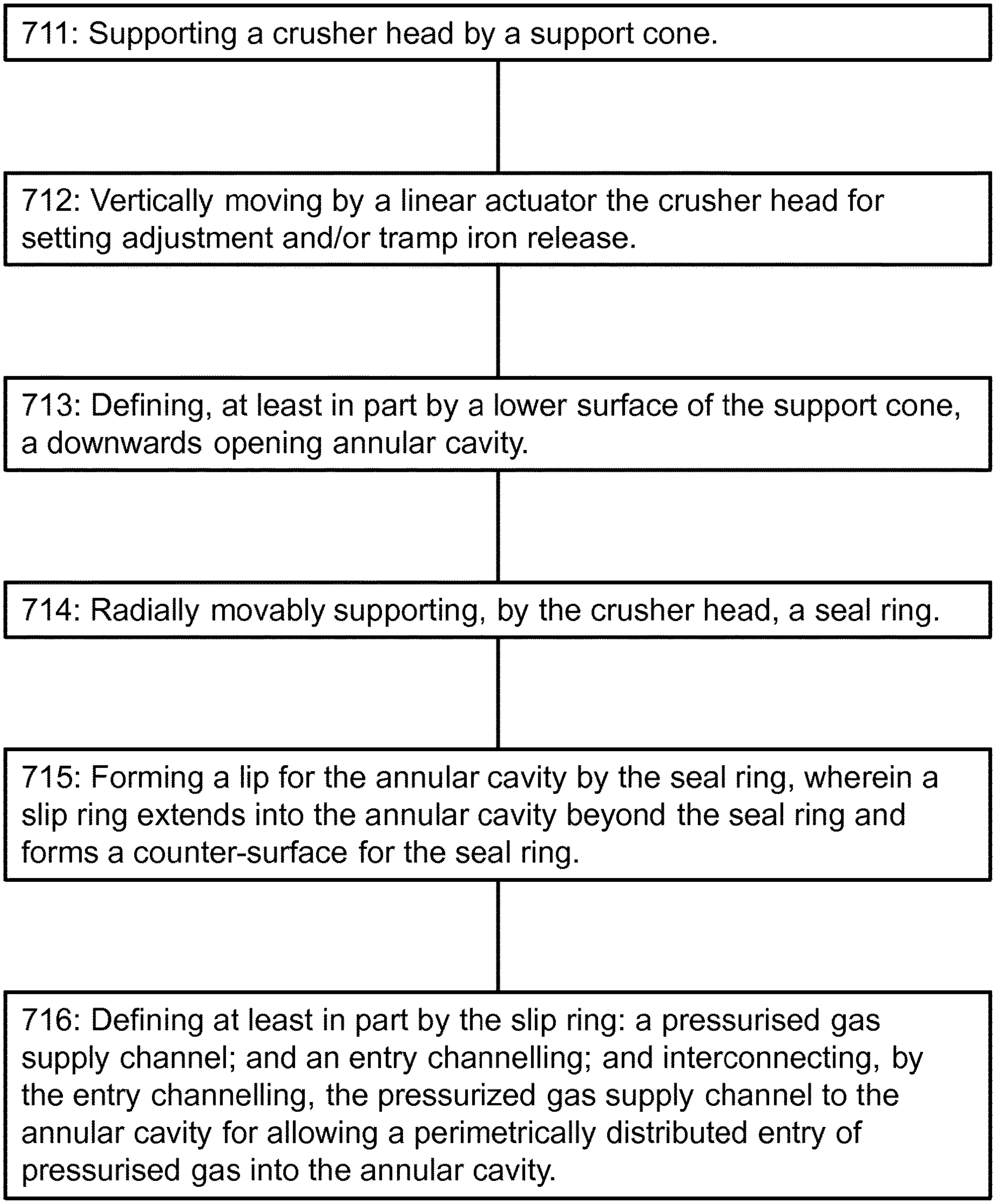
FIGS. 7A-7B show flow charts of example methods according to some example embodiments.
Figure 7B:
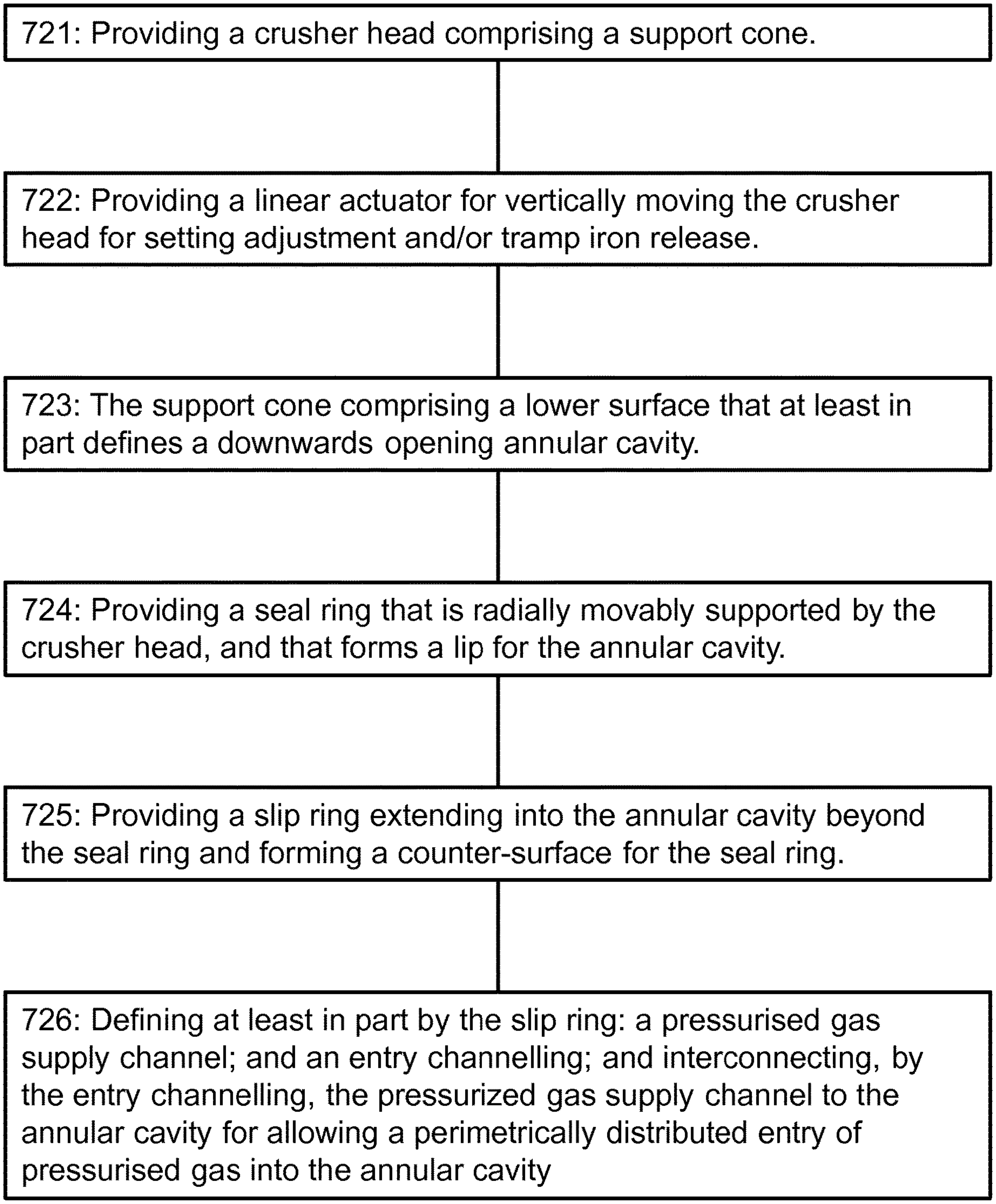

FIGS. 7A-7B show flow charts of methods according to example embodiments. FIG. 7A illustrates a method for blocking entry of dust into a cone crusher comprising various possible process steps while also further steps may be included and/or some of the steps may be skipped:

711: Supporting a crusher head by a support cone.

712: Vertically moving by a linear actuator the crusher head for setting adjustment and/or tramp iron release.

713: Defining, at least in part by a lower surface of the support cone, a downwards opening annular cavity.

714: Radially movably supporting, by the crusher head, a seal ring.

715: Forming a lip for the annular cavity by the seal ring, wherein a slip ring extends into the annular cavity beyond the seal ring and forms a counter-surface for the seal ring.

716: Defining at least in part by the slip ring: a pressurised gas supply channel; and an entry channelling; and interconnecting, by the entry channelling, the pressurised gas supply channel to the annular cavity for allowing a perimetrically distributed entry of pressurised gas into the annular cavity.

FIG. 7B illustrates a method for manufacturing a cone crusher comprising various possible process steps while also further steps may be included and/or some of the steps may be skipped:

721: Providing a crusher head comprising a support cone.

722: Providing a linear actuator for vertically moving the crusher head for setting adjustment and/or tramp iron release.

723: The support cone comprising a lower surface that at least in part defines a downwards opening annular cavity.

724: Providing a seal ring that is radially movably supported by the crusher head, and that forms a lip for the annular cavity.

725: Providing a slip ring extending into the annular cavity beyond the seal ring and forming a counter-surface for the seal ring.

726: Defining at least in part by the slip ring: a pressurised gas supply channel; and an entry channelling; and interconnecting, by the entry channelling, the pressurised gas supply channel to the annular cavity for allowing a perimetrically distributed entry of pressurised gas into the annular cavity.

An advantage provided by at least some of the presented embodiments is that a dust sealing of the crusher head may be improved. In particular, increased air flow inside the dust sealed area is provided resulting in increased air pressure preventing or at least diminishing dust penetration into the sealed area. A further advantage is that contamination of lubrication oil is prevented or at least reduced, reducing also wearing of parts of the crusher. Consequently, also the maintenance intervals are increased, down time decreased, and costs saved. Yet another advantage is that a slip ring comprising multiple entry channellings may be installed into existing cone crushers to provide improved dust sealing. Yet another advantage is that loss of lubrication oil is reduced in at least some example embodiments by perimetrically evening air flow so that peak velocities of gas flow can be reduced.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A cone crusher, comprising:

a crusher head comprising a support cone;

a linear actuator for vertically moving the crusher head for setting adjustment and/or tramp iron release;

the support cone comprising a lower surface that at least in part defines a downwards opening annular cavity; the cone crusher further comprising:

a seal ring that is radially movably supported by the crusher head, and that forms a lip for the annular cavity; and a slip ring extending into the annular cavity beyond the seal ring and forming a counter-surface for the seal ring;

wherein the slip ring at least in part defines:

a pressurised gas supply channel; and an entry channeling;

wherein the entry channelling interconnects the pressurised gas supply channel to the annular cavity for allowing a perimetrically distributed entry of pressurized gas into the annular cavity; and wherein the pressurised gas supply channel comprises a cover configured to be attached onto a surface of the slip ring.

2. The cone crusher of claim 1, wherein:

the slip ring at least in part defines a pressurised gas distribution passage, wherein the pressurised gas distribution passage interconnects the pressurised gas supply channel and the entry channelling.

3. The cone crusher of claim 2, wherein the pressurised gas distribution passage extends more than 30 degrees around the slip ring.

4. The cone crusher of claim 2, wherein the pressurised gas distribution passage consists of multiple separate sections and/or multiple independent channels.

5. The cone crusher of claim 1, wherein:

the slip ring comprises a skirt configured to seal with a lower frame of the cone crusher; and the pressurised gas distribution passage resides at least partially in a recessed portion of the skirt.

6. The cone crusher of claim 5, wherein the pressurised supply channel at least partly passes through the skirt.

7. The cone crusher of claim 5, wherein:

the slip ring comprises an outwards sloping flange on top of the skirt;

and the pressurised gas supply channel extends through the flange.

8. The cone crusher of claim 7, wherein the pressurised gas distribution passage resides at least partially in the flange.

9. The cone crusher of claim 7, wherein:

the slip ring comprises a neck on top of the flange; and the entry channelling extends through the neck and at least a portion of the flange.

10. The cone crusher of claim 2, wherein the pressurised gas supply channel conducts pressurised gas to the pressurised gas distribution passage.

11. The cone crusher of claim 10, wherein the supply channel comprises a cover configured to be attached onto a surface of the slip ring.

12. The cone crusher of claim 7, wherein the supply channel least partly passes through the flange.

13. An arrangement for dust blocking in a cone crusher that comprises: a crusher head comprising a support cone; a linear actuator for vertically moving the crusher head for setting adjustment and/or tramp iron release; the support cone comprising a lower surface that at least in part defines a downwards opening annular cavity; and a seal ring that is radially movably supported by the crusher head, and that forms a lip for the annular cavity; the arrangement comprising:

a slip ring configured to extend into the annular cavity beyond the seal ring and forming a counter-surface for the seal ring;

wherein the slip ring at least in part defines:

a pressurised gas supply channel; and an entry channelling;

and wherein the entry channelling interconnects the pressurised gas supply channel to the annular cavity for allowing a perimetrically distributed entry of pressurised gas into the annular cavity; and wherein the pressurised gas supply channel comprises a cover configured to be attached onto a surface of the slip ring.

14. A method for blocking entry of dust into a cone crusher, comprising:

supporting a crusher head by a support cone;

vertically moving, by a linear actuator, the crusher head for setting adjustment and/or tramp iron release;

defining, at least in part by a lower surface of the support cone, a downwards opening annular cavity;

radially movably supporting, by the crusher head, a seal ring; and forming a lip for the annular cavity by the seal ring;

using a slip ring that extends into the annular cavity beyond the seal ring as a counter-surface for the seal ring;

defining, at least in part by the slip ring:

a pressurised gas supply channel; and an entry channelling;

and interconnecting, by the entry channelling, the pressurised gas supply channel to the annular cavity for allowing a perimetrically distributed entry of pressurised gas into the annular cavity; and wherein the pressurised gas supply channel comprises a cover configured to be attached onto a surface of the slip ring.

15. A method for manufacturing a cone crusher, comprising:

providing a crusher head comprising a support cone; and providing a linear actuator for vertically moving the crusher head for setting adjustment and/or tramp iron release;

providing a downwards opening annular cavity in a lower surface of the support cone;

providing a seal ring that is radially movably supported by the crusher head, and that forms a lip for the annular cavity;

providing a slip ring extending into the annular cavity beyond the seal ring and forming a counter-surface for the seal ring;

defining, at least in part by the slip ring:

a pressurised gas supply channel; and an entry channelling;

and interconnecting, by the entry channelling, the pressurised gas supply channel to the annular cavity for allowing a perimetrically distributed entry of pressurised gas into the annular cavity; and wherein the pressurised gas supply channel comprises a cover configured to be attached onto a surface of the slip ring.

* * * * *